United States Patent

[11] 3,535,984

[72] Inventor Arthur F. Anderson
   Elmhurst, Illinois
[21] Appl. No. 716,735
[22] Filed March 28, 1968
[45] Patented Oct. 27, 1970

[54] AXIAL PISTON PUMP-MOTOR SYSTEM
   4 Claims, 15 Drawing Figs.
[52] U.S. Cl. ..................................... 91/506, 91/475
[51] Int. Cl. ..................................... F04o 15/00, F04b 1/02, F04b 9/00
[50] Field of Search.......................... 103/162, 38, 162(A), 162(B); 230/178; 92/57; 91/199

[56] References Cited
   UNITED STATES PATENTS

| | | | |
|---|---|---|---|
| 1,736,754 | 11/1929 | Thoma et al. | 103/162 |
| 2,241,701 | 5/1941 | Doe | 103/162 |
| 2,945,449 | 7/1960 | Le Febur et al. | 103/162X |
| 3,056,358 | 10/1962 | Pedersen et al. | 103/162 |
| 3,116,595 | 1/1964 | Kent et al. | 1103/162X |
| 3,237,570 | 1/1966 | Schott | 103/162 |
| 3,240,159 | 3/1966 | Andrews et al. | 103/162 |
| 3,303,794 | 2/1967 | Hagemann | 103/162 |
| 3,396,670 | 8/1968 | Baits | 103/162 |
| 2,731,569 | 1/1956 | Cardillo et al. | 103/38 |

Primary Examiner—William L. Freeh
Attorney—Dominik, Knechtel and Godula

ABSTRACT: An axial piston pump drive hanger system, pump, and drive motor having a plurality of axially aligned reciprocating pistons, the piston rod connections to a wear plate and drive flange being characterized by a central bore in the piston rod and connecting pads all of which permit hydrostatic fluid from the head of the piston to be transmitted through the connecting rod through a hydrostatic button contact with the wear plate. A hydraulic stroke control system spring biased to zero displacement is also disclosed, and a thrust isolated drive shaft connects to a planetary transmission with a rotating outer housing suitable for connection to a vehicular wheel.

Patented Oct. 27, 1970

INVENTOR.
Arthur F. Anderson

BY Dominik, Stein & Knechtel

Attys.

INVENTOR.
Arthur F. Anderson
BY
Dominik, Stein & Knechtel
Attys.

Patented Oct. 27, 1970

INVENTOR.
Arthur F. Anderson
BY
Dominik, Stein & Knechtel
Attys.

FIG. 11

INVENTOR.
Arthur F. Anderson
BY Dominik, Stein & Knechtel
Attys.

INVENTOR.
Arthur F. Anderson

BY Dominik, Stein & Knechtel

Attys.

AXIAL PISTON PUMP-MOTOR SYSTEM

The present invention relates to an axial piston pump motor system. More particularly the invention includes the hanger hydrostatic bearing system, and the structure rendering the same stable at high speeds, and efficient and durable at high loads.

Axial piston pump drives which may be used as either a pump or a drive are known in the prior art, such as exemplified in the U.S. Pats. of Janny, such as No. 924,787 issued June 15, 1909. Lubrication systems for such units are also shown as exemplified in No. 2,455,330. In the vast majority contemporary application of these structures complex roller bearing structures are employed to translate the reciprocating motion of the pistons into the rotary action of a drive shaft. While these structures exhibit relatively low starting friction characteristics, they are efficient and long-lived primarily when operated with relatively low loads. In addition, the bulk of the prior art axial piston hydraulic units when employed as a motor are relatively large in size as well as heavy for a given horsepower output.

It is thus one of the principal objects of the present invention to provide a drive unit of the axial piston type which is highly compact to the extent that substantial horsepower capacities can be buried within the hub of a vehicle wheel. A related object of the invention looks to the provision of a structure which, with minor parts and porting modification, can be converted into a pump for driving the in-wheel hydraulic motor.

Still another object of the invention is to provide an axial piston pump drive in which a substantial parts reduction over the prior art is achieved, without sacrificing the mechanical efficiency achieved at low as well as high loads and corresponding horsepower outputs.

Still another and more detailed object of the invention is to maximize the horsepower output for a given size and weight of axial piston drive hydraulic motors.

A more detailed object of the invention is to provide an axial piston pump drive hanger system which achieves the foregoing advantages with infinitely variable stroke control and reversing capability. Another modification permits the construction of an identical unit without parts change to a fixed displacement pump and/or drive. In addition, hydraulic or manual stroke control may be employed in the drive and/or pump.

The invention stems in part from the discovery that the hydrostatic pressures within the piston may be bled through the connecting rod and employed to lubricate as well as float the piston connecting rod engagement with the inclined wear plate of the drive flange. The structure utilized is dimensionally stable in both static and dynamic conditions thereby contributing to long life, and permitting a maximum application of torque and speeds which commensurately elevate the horsepower capacities for a given unit. Furthermore, by floating the principle driving elements on a thin film of the hydraulic medium working pressures greatly in excess of those tolerable by antifriction rolling type bearings can be achieved.

The invention, in part, is predicated upon the relationship between a drive shaft and a drive wheel, and a planetary gear assembly, as well as the suspending of the drive shaft within the unit. By positioning the relative parts in accordance with the present invention, the pinion of the planetary gearing is oriented within the revolving housing in such a manner that the rotational forces are primarily radial. Thereby the axial piston motor assembly drive may be freely supported by one set of roller bearings and a single thrust bearing to insure uniform gear loading. The uniform gear loading results from the freefloating action of the pinion in the planetary gear assembly. With such gear loading drive efficiencies are maximized, and distortional wear tendencies are minimized.

The invention will be more fully understood as well as its objects and advantages set forth above, when taken in conjunction with the accompanying illustrative drawings, in which.

Figures 1, 2, 3:
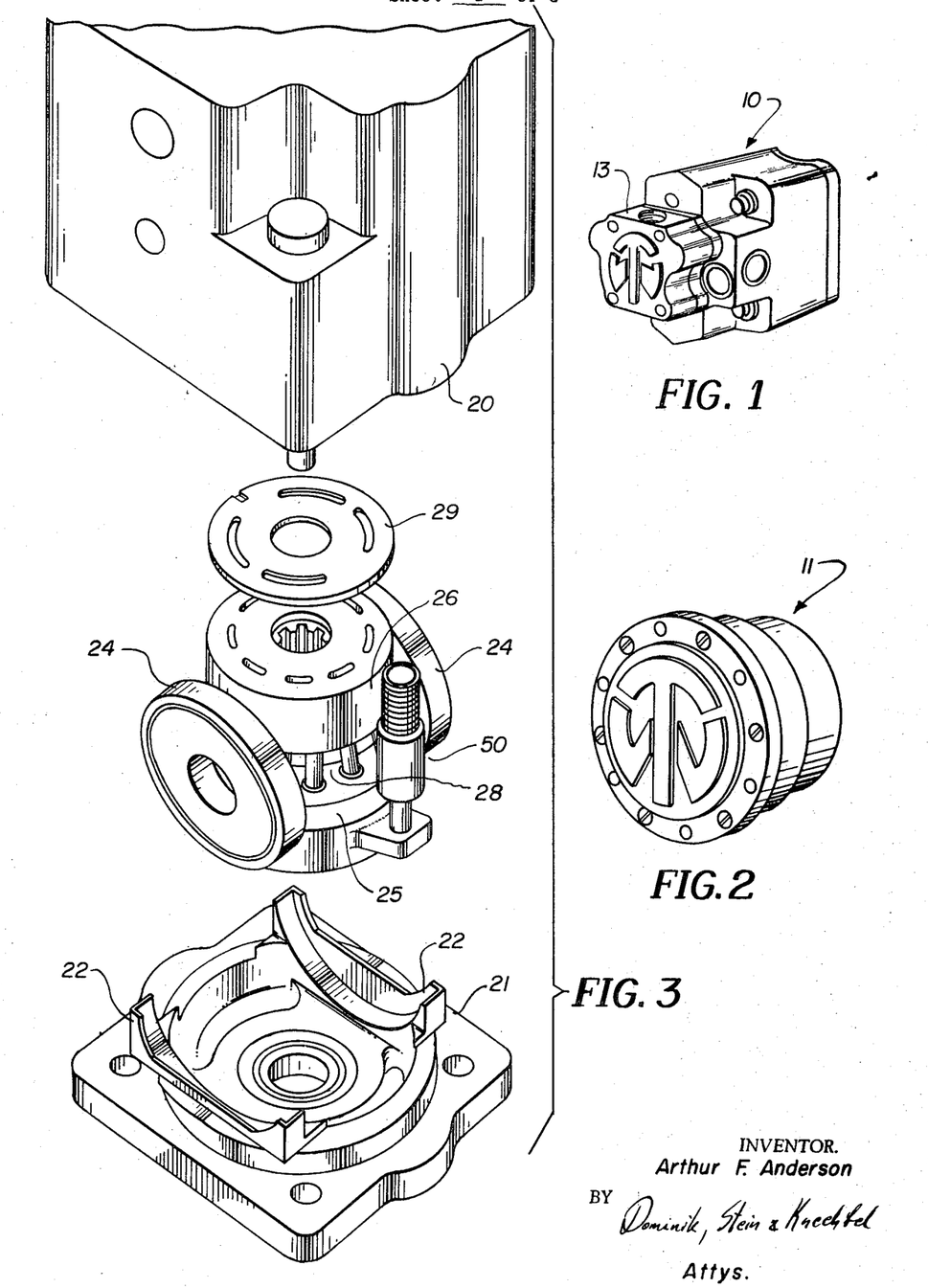
FIG. 1 is a perspective assembled view of a pump embodying the subject invention.
FIG. 2 is a perspective assembled view of a drive motor susceptible for mounting inside a wheel illustrative of the present invention.
FIG. 3 is a perspective exploded view of the principal elements of the mechanism employed in the pump or motor of FIGS. 1 and 2.

As will be noted in FIGS. 1 and 2 of the drawings, the pump 10 as shown in FIG. 1 is compact and has mounted immediately thereon a charge pump and auxiliary pump assembly 13. A pump of this character capable of delivering 100 horsepower weighs approximately 15 pounds, and fits within a 5-inch cube.

Operating pressures to 10,000 p.s.i. and speeds to 12,000 r.p.m. are possible. As pointed out above, a charge pump as well as an auxiliary pump is conveniently mounted on the same drive shaft. The motor 11 shown in FIG. 2 is cylindrical in configuration, and lends itself ideally to the insertion within a drive wheel of such products as straddle carriers, special purpose loaders, and track laying equipment. Additionally, it will be appreciated that with the high shaft r.p.m. and gearing employed, drive units with very low speeds can be developed for use around equipment servicing jet aircraft. Nevertheless, by varying the displacement of the drive unit through an infinitely adjustable control and reversing mechanism, good speeds can be obtained for transporting the equipment from one job unit to another.

Figure 13:
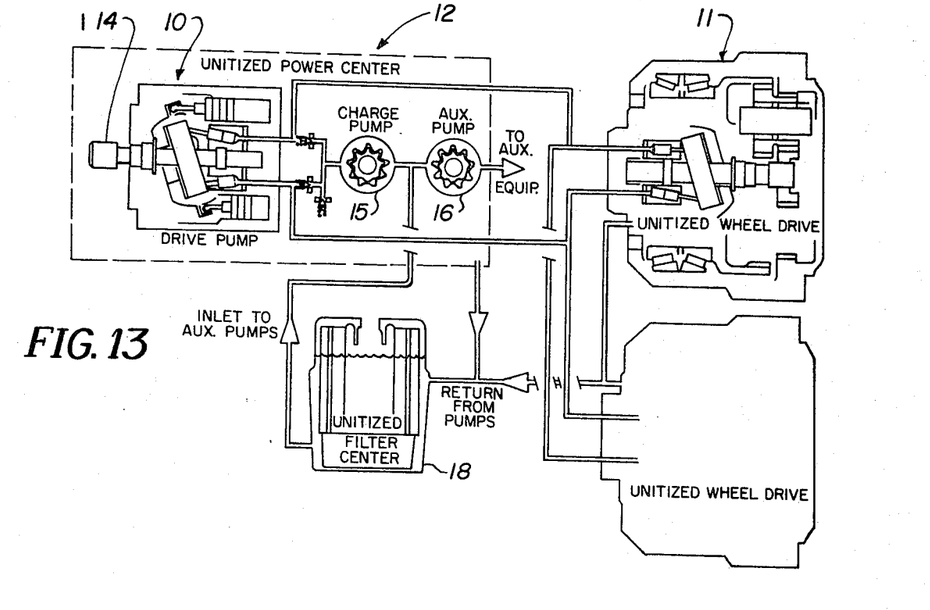
FIG. 13 is a schematic circuit diagram showing the relationship between the drive pump, unitized wheel drives, filter center, and charge and auxiliary pumps.

Referring now to FIG. 13, it will be observed that the pump 10 and unitized wheel drive 11 are connected by conventional hydraulic circuitry. No special hose lines are required, nor special fittings, all being available commercially and oftentimes employed on existing equipment. The power center 12 includes the pump 10 as well as a charge pump 15 and auxiliary pump 16. All three pumps are driven off the main drive shaft 14, the charge pump 15 serving to deliver fluid from the filter center 18 directly to the main pump 10, thereby minimizing the size of the filter center and/or reservoir. The auxiliary pump 16 is provided to drive related equipment, but may also be employed for hydraulically driving the stroke control and hydraulically reversing either the drive pump 10, or the unitized wheel drive 11.

Turning now to FIG. 3, it will be seen that the unit contemplates three basic assemblies. The housing is the large outer casting 20, closed at one end by the cover assembly 21. A semitrunion 22 is integral with the cover 21, and serves to support the bearing race 24 of the hanger assembly 25. Integral with the hanger assembly is the cylinder block 26 which houses a plurality of reciprocating pistons in the individual cylinders 27. The drive flange 28 is operatively coupled to the main drive shaft as is the cylinder block 26 as will be detailed hereinafter. A stationary valve plate 29 abuts the end of the cylinder block 26 which includes a plurality of ports which are positioned for relative open and closed timed communication with the ports in the valve plate 29.

Figure 4:
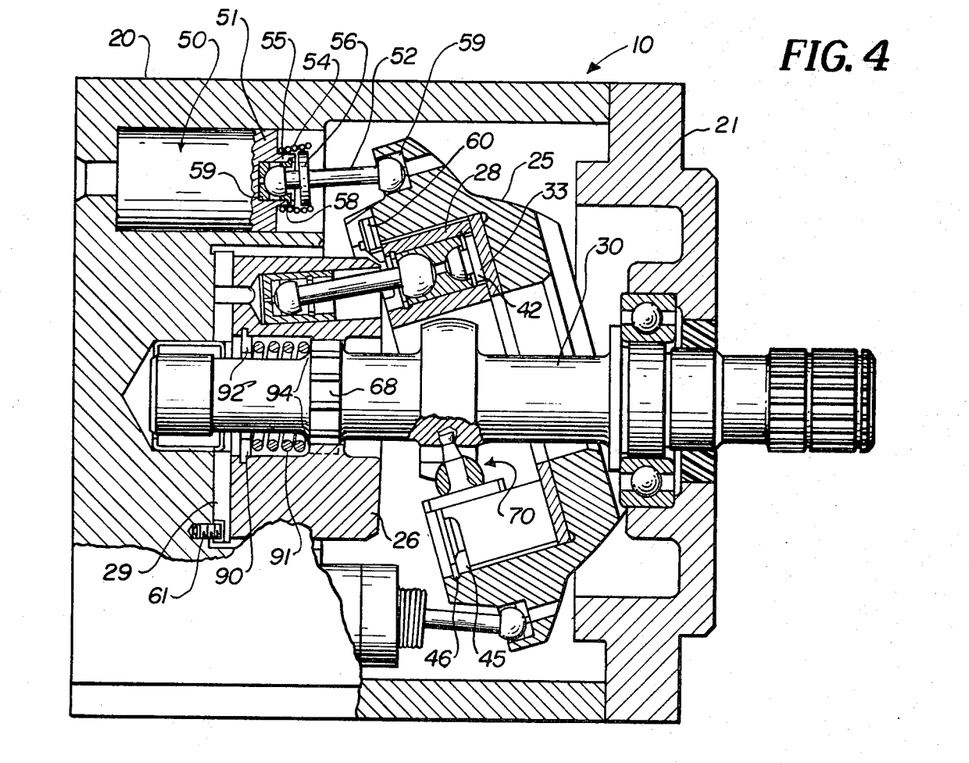
FIG. 4 is a transverse sectional view of a pump embodiment illustrative of the present invention.

Turning now to FIG. 4, it will be seen that the pump 10 has a cylindrical or boxlike housing 20 which is closed at one end by the cover 21. A drive shaft 30 runs through the center of the pump and is radially suspended therein by the universal joint 70, one end protruding for the connection to a drive motor, and the other end may optionally extend through the housing 20 to join the auxiliary and charge pump assembly 13 such as shown in FIG. 1, but omitted from FIG. 4.

Figure 5:
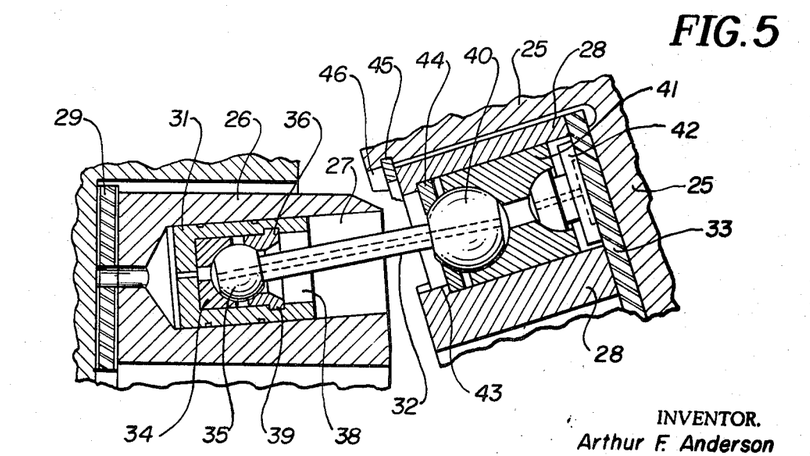
FIG. 5 is an enlarged partially broken sectional view of the piston and its connection to the drive flange.

Referring now to FIG. 5, it will be seen that each piston 31 is mounted for reciprocation within the individual cylinder 27 in the cylinder block 26. The valve plate 29 selectively communicates with the hydrostatic fluid source (not shown) to permit high pressure fluid to enter into the cylinder at the upper end of the piston 31 to drive the same. As the piston 31 reciprocates in the cylinder 27, the connecting rod 32 also reciprocates and transmits its force onto a wear plate 33. The wear plate 33 is positioned within the drive flange 28 which is coupled by means of a universal joint assembly to the drive shaft 30 as will be described hereinafter. In greater detail, it will be seen that the piston 31 has nesting in its piston bore 38 a socket 34 which engages the connecting rod piston end rounded portion 35, and is secured in place by a piston connecting rod keeper 36 which snapfittingly engages the piston keeper groove 39 defined in the piston bore 38. Once the piston connecting rod keeper 36 is snapped into place, the connecting rod 32 is fixedly and yet partially universally swiveled within the piston 31, and cannot be removed without special tooling, and accordingly is dimensionally both statically and dynamically secured within the piston 31. The dotted lines in FIG. 5 show a bore longitudinally through the entire length of the connecting rod 32, as well as a bore through the center of the piston 31 and the center of the socket 34. As the description of the drive flange connection proceeds, it will become apparent that an open hydraulic circuit is provided to bleed off a portion of the hydraulic fluid from the driving end of the piston 31 until the same floods the wear plate interface with the hydrostatic button 42, and in operation provides a thin film of fluid of approximately .0002 inches to constantly lubricate the wear plate 33 as well as reduce friction at the wear point. Furthermore, because the thin film of oil constantly lubricates the interfacial relationship between the hydrostatic button 42 and the wear plate 33, as increased pressures are applied, an increasing pressure gradient occurs across the face of the hydrostatic button 42, and thereby permits load transfers up to as high as 15,000 lbs. p.s.i. at the driving point, corresponding loads being intolerable by conventional antifriction bearing structures.

It will be noted that the connecting rod flange end 40 is spherical, and rests within the flange drive socket 41. A keeper ring for the flange drive socket 44 is provided at the inner portion of the connecting rod flange end 40, and abuts a shoulder 43 which thereby dimensionally stablizes the connecting rod flange end 40 within the drive flange 28. A holddown ring 45 is secured to the outer portion of the drive flange 28, and a holddown ring snap ring 46 in the hanger 25 longitudinally secures the relationship between the drive flange 28 and the hanger 25. All of the elements described above are repeated nine times as will appear from FIG. 6, and end view of the drive flange 28.

As set forth above, it will be seen that despite the reciprocation of the connecting rod 32, a continuous open communication is kept for the transmission of high pressure hydraulic fluid through the piston, connecting rod, and on to the hydrostatic button to the end that the hydrostatic button rides on a film of pressure gradient fluid against the wear plate 33. In the position shown in FIG. 5, the piston 31 has just completed discharging its displacement of pressure fluid through the valve plate 29 into the system. The next 180° of motion will see the piston 31 sucking low pressure fluid into the upper end of the cylinder 27 at which time the keeper for the flange drive socket 44 retains the connecting rod flange end within the drive flange 28. During this portion of the cycle the pressure gradient between the hydrostatic button 42 and the wear plate 33 is of no major significance. During the subsequent 180°, however, as the piston 31 begins pressurizing the fluid at its head, a predetermined portion of the fluid will pass through the longitudinal bore of the connecting rod 32, and migrate through the hydrostatic button central bore to provide the lubricating film at the interface between the hydrostatic button 42 and the wear plate 33. Reversely, of course, when the unit is operating a motor, as the piston 31 moves downwardly, high pressure fluid will migrate through the central bore of the connecting rod 32, and similarly coat the interface between the hydrostatic button 42 and the wear plate 33 with a film of lubricant approximately .0002 inches thick, subject to a pressure gradient which varies in direct proportion to the load between the hydrostatic button 42 and the wear plate 33. In all instances, the load is transmitted by the drive flange 28 when employed as a pump to the connecting rod 32, by the flange drive socket 41. In the one instance, the load is transferred from the drive flange to the connecting rod when employed as a pump, and reversely transferred from the connecting rod to the flange drive socket and then to the drive flange when operating as a motor.

In order to vary the total displacement of the pump, the hanger assembly 25 is universally swiveled to the drive shaft 30 by the universal joint assembly 70. At diametrically opposed positions on the hanger 25, sockets 59 are provided to couple with the stroke control connecting rod 52 in the stroke control assembly 50. The stroke control assembly 50 is motivated primarily by the stroke control piston 51, the connecting rod 52 for which has substantially identical partially spherically rounded ends, both of which nest within substantially identical sockets 59 (see FIGS. 14, 15). The stroke control connecting rod 52 is provided with a stroke control positioning spring 54, a coil spring, which clampingly engages a positioning spring collar 55 on the stroke control piston 51. A positioning spring shoulder 56 is provided on the connecting rod 52, thereby permitting the stroke control positioning spring 54 to bias the stroke control piston 51 and the connecting rod 52. When it is appreciated that there are two stroke control assemblies 50 at diametrically opposed positions, and the hanger 25 is pivotally mounted perpendicular to the drive shaft 30, it will be seen that a zero displacement configuration is achieved when no pressures are fed into the stroke control assembly 50 in order to move the stroke control piston 51. As pointed out in connection with the description of the system shown in FIG. 13, the auxiliary pump 16 is employed to deliver pressure fluid to the stroke control piston 51, selectively, to the end that the angular position of the hanger 25 may be carefully controlled. In the position of zero angularity, of course, there is a zero displacement neutral positioning. At one angle, the pump will discharge fluid from one port, and at the opposite angle, from another port. Similarly, when employed as a motor, infinitely variable stroke may be achieved, as well as reversibility through the infinitely variable range by employing same stroke control assembly 50.

Figure 14:
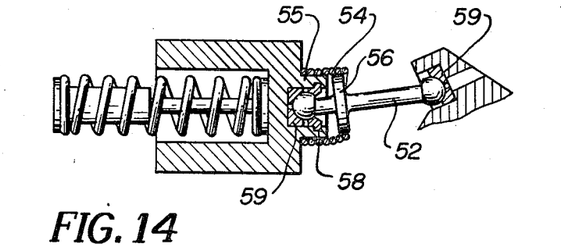
FIG. 14 is an enlarged sectional view of the stroke control piston and orienting spring at its fully retracted position.
Figure 15:
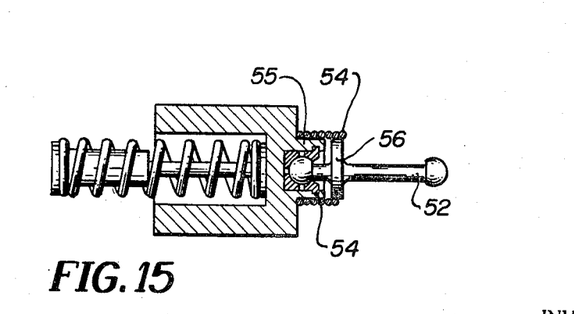
FIG. 15 is an enlarged view corresponding to FIG. 14 showing the connecting rod disengaged from the hanger and centered for repositioning.

It will be further appreciated from FIGS. 14, 15 that the stroke control biasing spring 54, because it will reorient its connecting rod 52 axially with the stroke piston 51 if the connecting rod 52 disengages its hanger socket 59, realigns the same for subsequent coupled engagement between the piston 51 and the hanger socket 59. A connecting rod keeper 58 of similar design to the piston connecting rod keeper 36 (see FIG. 5) is employed to secure the piston end of the stroke control connecting rod 52 within its socket 59. Similarly the drive flange 28 is held against dislodgment from the hanger 25 by means of a holddown ring 45, a holddown ring snap ring 46, but additionally the holddown ring lock pin 60 is provided to prevent the snap ring 46 from rotating as the drive flange 28 rotates in the hanger 25, the latter remaining stationary relative to the rotation of the drive flange 28. Naturally there is no rotation of the stroke control assembly with reference to the hanger 25. Similarly, a valve plate lock pin 61 is provided to secure the valve plate 29 against rotation, while the cylinder block 26 rotates in unison with the drive flange 28.

Figure 9:
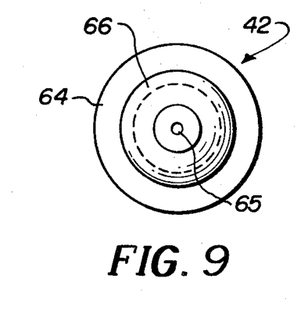
FIG. 9 is an enlarged end view of the hydrostatic button which connects the lower end of the piston connecting rod to the wear plate within the hanger block.
Figure 10:
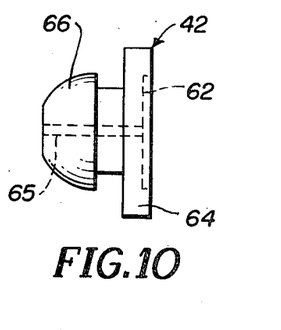
FIG. 10 is a side view of the hydrostatic button shown in FIG. 9.

While the hydrostatic button 42 was referred to and described as to its function above, it will be observed from FIGS. 9 and 10 that the hydrostatic button 42 includes a hydrostatic button relief area 62 which is surrounded by the hydrostatic button balance seal pad 64, an annular ring around the periphery of the hydrostatic button and which has the basic interfacial relationship with the wear plate 33. The hydrostatic button orifice 65 extends through the hydrostatic button swivel 66, and transmits the pressure fluid from the longitudinal bore within the connecting rod 32 into the hydrostatic button relief area 62, and a pressure gradient from the operating pressure ahead of the piston 31 transfers across the pad 64 to the low pressure of the interior of the pump or drive unit which is in the order of 10 p.s.i. or less.

Figure 6:
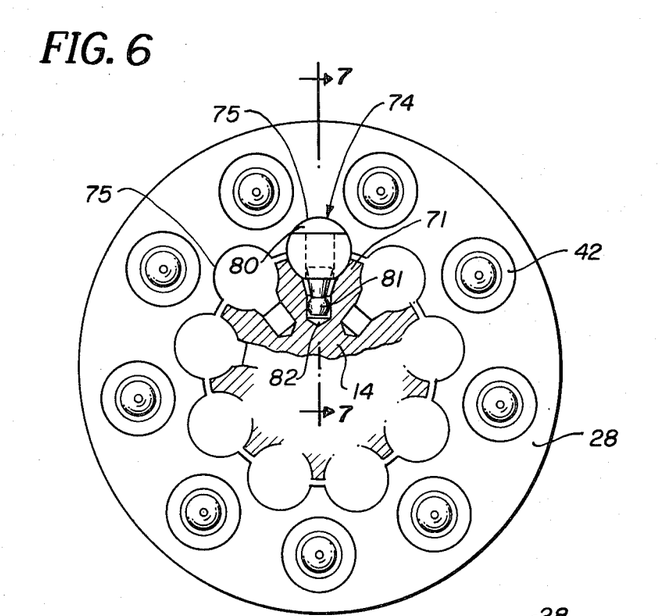
FIG. 6 is a front view of the drive flange, partially sectioned to illustrate the universal joint connection between the drive flange and drive shaft.
Figure 7:
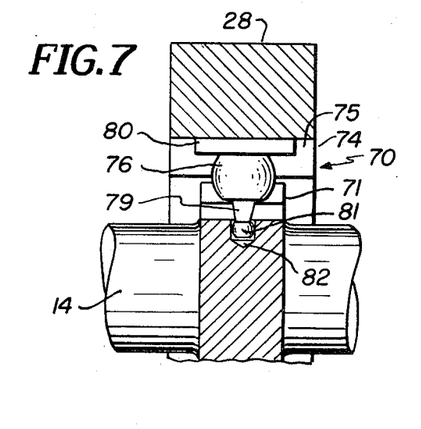
FIG. 7 is a transverse broken section in enlarged scale taken through section lines 7–7 of FIG. 6 illustrating the universal joint connection between the drive flange and drive shaft shown in the neutral position.
Figure 8:
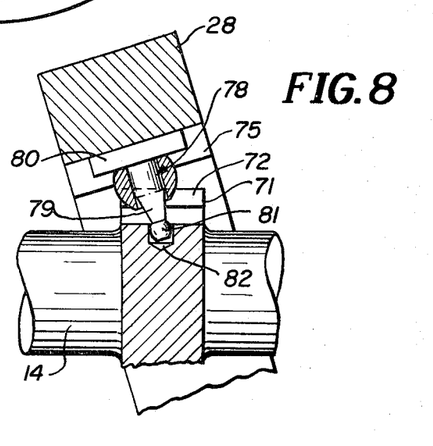
FIG. 8 is a view similar to FIG. 7 illustrating the tilted maximum displacement relationship between the drive flange and the drive shaft.

As set forth above, the drive flange 28 (as shown in FIG. 6) is connected by means of a universal joint assembly 70 to the drive shaft 14. The details of this universal joint assembly 70 are shown in FIGS. 6, 7, and 8, which will be hereinafter described in greater detail. First, it will be seen that a splinelike structure forms the universal joint inner race 71 on the drive shaft 14. The inner race 71 has a cylindrical groove 72, and the drive flange outer race 74 is formed by a cylindrical groove 75 within the drive flange 28. It will be observed (see FIG. 6) that the universal joint elements are on offset radial spacing from the hydrostatic buttons 42, there being nine of each. The universal joint drive ball 76 is mounted on a drive ball positioner 78. The drive ball positioner 78, as will be best observed in FIGS. 7 and 8, includes a drive ball positioner stem 79, which terminates in a drive ball positioner cross head 80. The cross head 80 (see FIG. 6) has a cylindrical outer surface which slidably engages the cylindrical groove 75 in the drive flange outer race 74. The connection to the drive shaft 14 is achieved by means of the drive ball stem pivot 81 which nests within the drive ball stem pivot hole 82 in the drive shaft 14. It will be appreciated from the relationship between the angles shown in FIGS. 7 and 8, that a mirror image of the angle relationship in FIG. 8 may also be achieved. The universal joint transmits the rotary torque of the drive flange 28 which, as set forth above, is transmitted through the connecting rod 32 to the flange drive socket 41 by means of the interaction between the hydrostatic button 42 and the wear plate 33.

Figure 11:
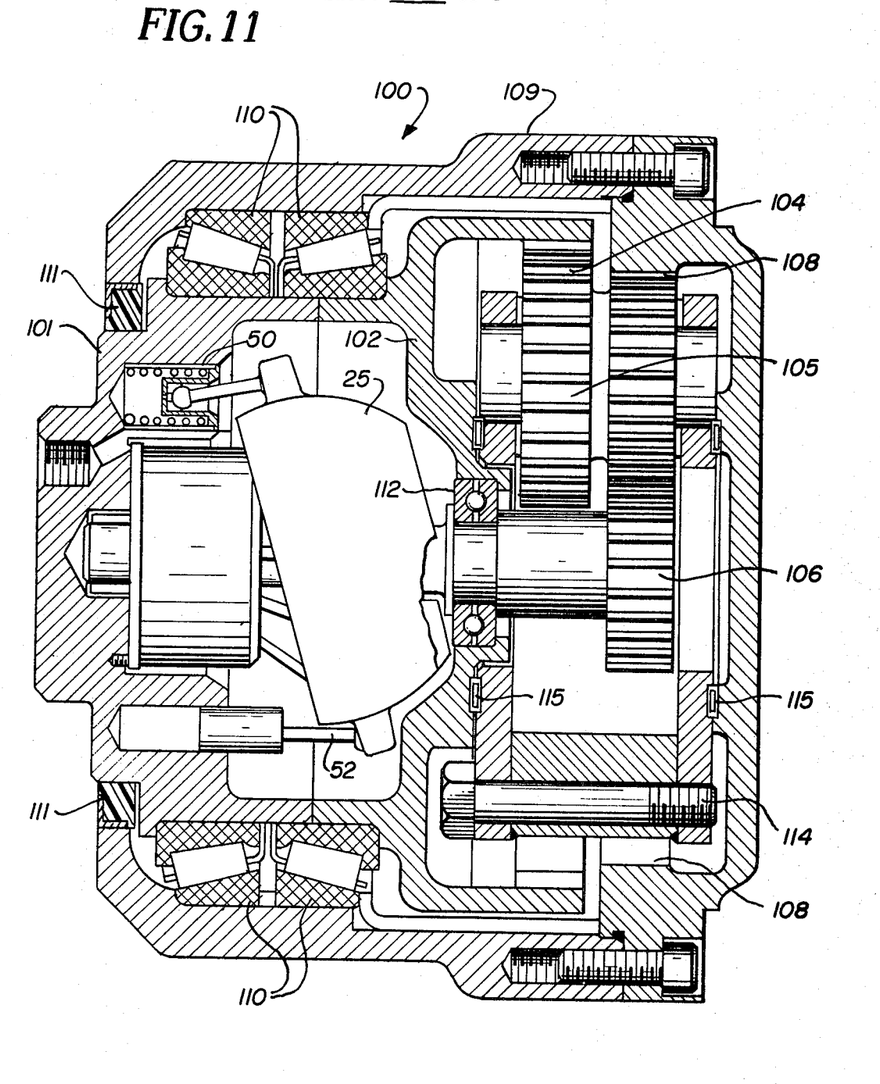
FIG. 11 is a transverse sectional view of a variable displacement motor, transmission, and drive wheel illustrative of the invention.

Another important advantage achieved by the universal joint assembly 70 will be appreciated when the variable displacement drive of FIG. 11 is considered in its assembled relationship. It will be noted that the entire drive assembly includes a rotatable housing 109 and stationary housing 101 with a single set of radial bearings 110 to suspend the two for relative rotation. Because the universal joint assembly 70 is suspended by the hanger 25 with relationship to the stationary housing 101, a single thrust bearing 112 positioned along the drive shaft 30 absorbs the axial thrust of the drive shaft 30 isolating the same from the planetary gear assembly. Therefore the pinion 106 of the planetary gear assembly which is directly coupled to the drive shaft 30 transmits only radial forces. The freely supported operation of the pinion within the planetary transmission insures uniform gear loading. The uniform gear loading, in turn, maximizes power distribution, and minimizes distortional wear characteristics.

Because of the related torques and the necessity for constant spring loaded pressure between parts, it will be seen in FIG. 4 that a drive shaft thrust assembly 90 has been provided to constantly urge the drive shaft away from the cylinder block, or conversely, to maintain a constant pressure on the cylinder block 26 against the valve plate 29. As will be seen, a drive shaft thrust cylinder block spring 91 rides against a cylinder block keeper 92 at one end of the spring, and biases itself at the other end at the spline spring shoulder 94 of the cylinder block shaft spline 68.

While the description thus far has been primarily directed to a pump construction such as that shown in FIG. 4, as will be observed in FIG. 11, the identical structure and interchangeable parts may be provided in a variable displacement motor 100 which is highly compact, and contains its own transmission which gears down the high speed rotation of the drive shaft 14 to hub speeds which are compatible with conventional vehicular usage. As will be seen in FIG. 11, the variable displacement motor 100 has a stationary housing 101 which is fixedly secured to the vehicle. A fixed internal gear 102 forms part of the inner housing, terminating in fixed internal gear teeth 104. As will be seen, a planet cluster gear 105 engages the fixed internal gear teeth 104, and transmits by rotatable connection to the pinion gear 106, its radial force to the output internal gear 108. The output internal gear 108 is fixed to the revolving housing 109, and journaled by means of the load bearing assembly 110 to the stationary housing 101. An oil seal 111, only one being required, effectively seals the interior portion of the variable displacement motor 100 from dirt, as well as oil leakage of the low pressure interior fluid.

It will also be noted that a single thrust bearing assembly 112 is provided at the connecting point between the fixed internal gear 102 and the gear assembly which connects to the revolving housing 109. By providing a thrust bearing at this point, only radial torque is transmitted to the planetary gear assembly 114, the same being secured by means of planet carrier thrust bearings 115.

Figure 12:
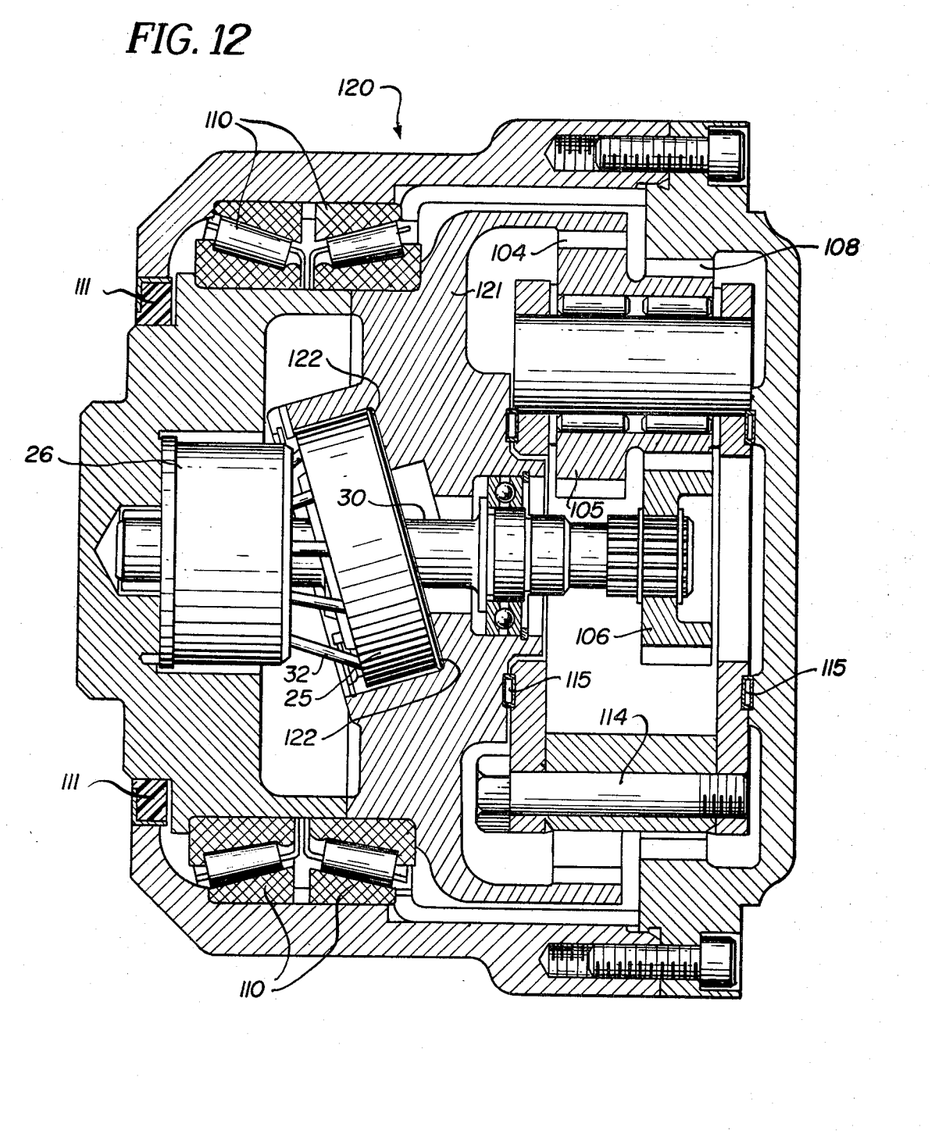
FIG. 12 is a transverse sectional view of a fixed displacement motor and transmission for wheel mounting taken along the same section as FIG. 11.

The fixed displacement motor 120 disclosed in FIG 12 is substantially identical with the construction of the variable displacement motor shown in FIG. 11, except that the stroke control assembly 50 is omitted, and, instead, the drive flange fixed support recess 122 in the fixed internal gear 121 supports the drive flange in fixed angular relationship thereby fixing the displacement of the drive motor.

In review it will be seen that a system and structure has been shown and described for an axial piston pump-drive construction. Basic to all of the structures, whether pump or drive motor, is a hydrostatic connection between the working area of each individual piston and its thrust button engagement with the drive plate of the drive flange. All of the elements have been secured against dislodgement and dynamically lock each to the other to the end that assembly is facilitated, and dynamic close relationships are maintained even at speeds as high as 12,000 r.p.m. Where variable displacement is desired in either pump or drive, the same is coupled to the common hanger, and centeringly spring loaded to the end that failure of the auxiliary pump will zero out the displacement and the motor or pump will idle in a safe condition. By varying the control systems, the motor can serve as a brake, the pump can serve as a brake, and each is selectively reversible. Furthermore, infinite ranges of displacement and thus drive speeds and torques may be provided. Finally, because of the hydrostatic nature of the bearing assembly in the drive, maximum horsepower can be transmitted in an inexpensive structure, and sufficiently compact to serve as a motor drive within a conventional vehicular wheel.

While the invention has been described in connection with specific embodiments and applications, no intention to restrict the invention to the examples shown is contemplated, but to include within the invention all of the subject matter defined by the spirit as well as the letter of the annexed claims.

I claim:

1. An axial piston pump having a plurality of pistons within a cylinder block in load engagement with an inclined wear plate supported by a hanger, and hydrostatic button means in structural and hydraulic communication with the piston, including pad means at the base of the hydrostatic button for load engagement with the wear plate, the system being proportioned to bleed pressure fluid to the interface between the hydrostatic button and wear plates as a function of the pressure fluid on the piston thereby delivering a film of hydraulic fluid to float the hydrostatic button on the wear plate in a proportional relationship to the piston load, the improvement comprising stroke control means, including: a pair of pistons diametrically flanking the cylinder block, conduit-cylinder means for selectively delivering pressure fluid to the aforesaid pistons for moving the same, connecting rods connected swivelably to the hanger and piston, a shoulder on the connecting rod, and a centering spring biasing the connecting rod shoulder and piston whereby the hanger is returned to a neutral position in the event of auxiliary pressure failure to the stroke control piston, the spring further serving to insure pressure contact between the connecting rod and hanger.

2. A paraxial multipiston hydraulic pressure mechanism having a cylinder block, a drive flange, a hanger, and means for translating the reciprocation of the piston to an angularly adjustable wear plate in the hanger, a hydrostatic lubrication and stroke control system comprising: port means in the piston head, a connecting rod having a central longitudinal bore, means coupling the connecting rod central bore in open communication with the piston port, a hydrostatic button in flatface relationship with the wear plate, and port means in the hydrostatic button proportioned to bleed fluid into the base of the hydrostatic button at the interface with the wear plate, stroke control means comprising a pair of pistons diametrically flanking the cylinder block, conduit-cylinder means for selectively delivering pressure fluid to the aforesaid pistons for moving the same, connecting rods connected swivelably to the hanger and piston, a shoulder on the connecting rod, and a centering spring biasing the connecting rod shoulder and piston whereby the hanger is returned to a neutral position in the event of auxiliary pressure failure to the stroke control piston, the spring further serving to insure pressure contact between the connecting rod and hanger.

3. An axial piston assembly comprising, in combination, a hanger, a drive shaft, a housing, a cover, semitrunions in the cover forming a hanger bearing support, a needle bearing support cradling the hanger in the cover semitrunions, means defining a drive shaft central bore in the hanger; a cylinder block, a drive flange, bore means in the cylinder block and drive flange to receive the drive shaft; universal means connecting the drive flange to the drive shaft, means connecting the cylinder block to the drive shaft, an inclined wear plate in the drive flange, a plurality of pistons in the cylinder block, connecting rods on said pistons disposed in axial alignment with the drive shaft, conduit means selectively in open communication with the pistons, a hydrostatic button connecting each connecting rod to the wear plate, conduit means through the piston, connecting rods, and hydrostatic button, the same oriented and proportioned to deliver pressure fluid to the interface between the hydrostatic button and the wear plate in a direct relation to the amount of load on the pistons transmitted to the drive shaft through the aforesaid power train; a pair of pistons diametrically opposed in the housing, conduit-cylinder means for selectively delivering pressure fluid to the aforesaid pistons for moving the same, connecting rods connected swivelably to the hanger and piston, a shoulder on the connecting rod, and a centering spring biasing the connecting rod shoulder and piston whereby the hanger is returned to a neutral position in the event of auxiliary pressure failure to the stroke control piston, the spring further serving to insure pressure contact between the connecting rod and hanger.

4. In an axial piston pump drive hanger assembly having a plurality of pistons within a cylinder block, said pistons being in load engagement with a wear plate, said wear plate being supported by a hanger, the improvement in stroke control means comprising a pair of pistons diametrically flanking the cylinder block, conduit-cylinder means for selectively delivering pressure fluid to the aforesaid pistons for moving the same, connecting rods connected swivelably to the hanger and piston, a positioning spring shoulder on the connecting rod, a positioning spring collar on the stroke control piston, and a positioning spring biasing the connecting rod shoulder and piston while clampingly engaging the positioning spring collar on the stroke control piston and encircling the positioning spring shoulder on the connecting rod whereby the hanger is returned to a neutral position in the event of auxiliary pressure failure to the stroke control piston, the spring serving additionally to insure pressure contact between the connecting rod and hanger and alignment in the event of dislodgement.